(12) United States Patent
Hirabayashi (10) Patent No.: US 8,342,759 B2
(45) Date of Patent: Jan. 1, 2013

(54) BARRIER UNIT

(75) Inventor: Koichiro Hirabayashi, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/716,410

(22) Filed: Mar. 3, 2010

(65) Prior Publication Data

US 2010/0226642 A1 Sep. 9, 2010

(30) Foreign Application Priority Data

Mar. 5, 2009 (JP) ................................. 2009-051710

(51) Int. Cl.
*G03B 17/00* (2006.01)
(52) U.S. Cl. ........................ 396/448; 359/511
(58) Field of Classification Search .................. 396/448, 396/493, 510; 359/511
See application file for complete search history.

(56) References Cited

U.S. PATENT DOCUMENTS

| | | | | |
|---|---|---|---|---|
| 5,659,826 | A * | 8/1997 | Kameyama | 396/378 |
| 6,443,634 | B1 * | 9/2002 | Tsuboi | 396/448 |
| 2004/0196573 | A1 * | 10/2004 | Nomura et al. | 359/701 |
| 2005/0117900 | A1 * | 6/2005 | Ohmori et al. | 396/448 |
| 2007/0274709 | A1 * | 11/2007 | Ho | 396/448 |
| 2008/0192326 | A1 * | 8/2008 | Mizumaki et al. | 359/234 |
| 2009/0147127 | A1 * | 6/2009 | Ogawa et al. | 348/374 |
| 2010/0027986 | A1 * | 2/2010 | Katano | 396/448 |

FOREIGN PATENT DOCUMENTS

| | | |
|---|---|---|
| JP | 5-027301 | 2/1993 |
| JP | 2005-106934 | 4/2005 |
| JP | 2006-317686 | 11/2006 |
| JP | 2007-121781 | 5/2007 |
| JP | 2007-322872 | 12/2007 |

OTHER PUBLICATIONS

Translation of JP Publication No. 2007-199260; Inventor: Masuda, Takanari; Title: Lens Barrel and Camera; Publication Date: Aug. 9, 2007.*

* cited by examiner

*Primary Examiner* — Christopher Mahoney
*Assistant Examiner* — Fang-Chi Chang
(74) *Attorney, Agent, or Firm* — Panasonic Patent Center (57) ABSTRACT

A barrier unit is provided that suppresses reflection of light at end faces of blades when the blades are in an open state and that prevents the blades from riding on top of each other. The barrier unit includes a base; and a pair of blades mounted on the base, the pair of blades being configured to be positioned in an open state and a closed state and to contact each other at predetermined end faces of the blades in the closed state. An inclined portion is provided at a central portion in a longitudinal direction, of each predetermined end face of the blades, the inclined portion defining a plane inclined with respect to an optical axis of a lens. A parallel portion is provided on both sides of the inclined portion of each predetermined end face of the blades, the parallel portion defining a plane parallel to the optical axis.

10 Claims, 8 Drawing Sheets

BARRIER UNIT

BACKGROUND ART

1. Technical Field

The technical Field relates to barrier units used to protect lenses, and so on, of still cameras and video movie cameras.

2. Related Art

JP-A-5-27301 discloses a conventional barrier unit. According to the barrier unit, an excellent blocked state can be obtained using two blades of substantially the same shape.

Figure 12:
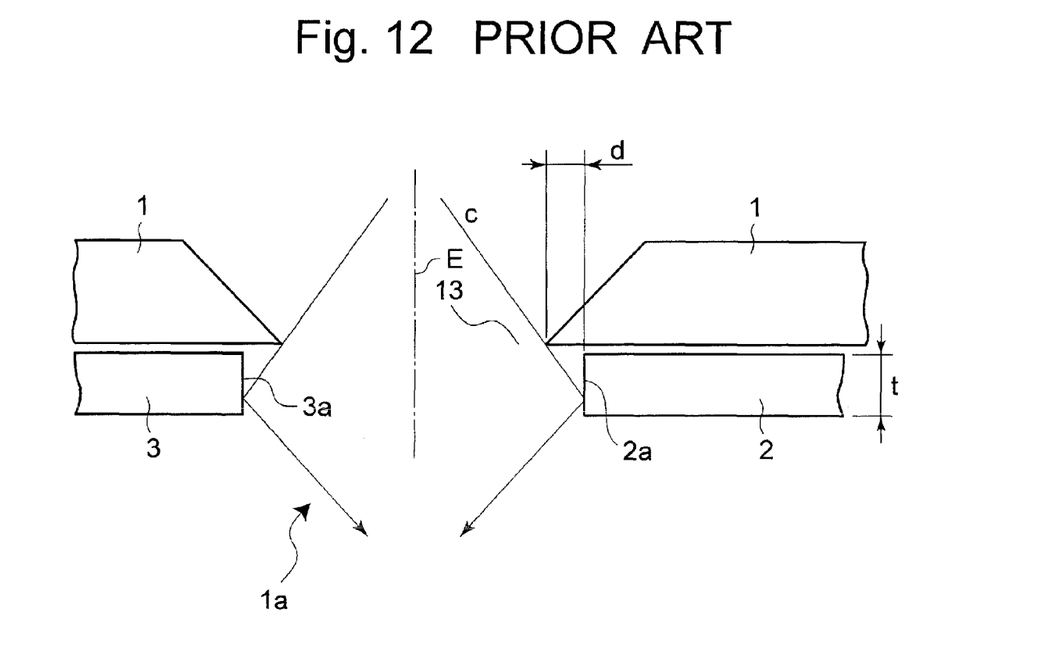
FIG. 12 is a cross-sectional view of a conventional barrier unit with blades being in an open state (central portions of the respective blades).

FIG. 12 is a cross-sectional view of a conventional general barrier unit, taken along an optical axis direction. The barrier unit includes a cover 1 having an opening portion 1a that allows light C to incident therethrough; and a pair of first and second blades 2 and 3 that can open and close the opening portion 1a of the cover 1. The blades 2 and 3 are provided symmetrical to each other with an optical axis E therebetween. In an open state of the pair of blades 2 and 3 as shown in FIG. 12, predetermined end faces 2a and 3a which are parallel to the optical axis direction retreat outside the opening portion 1a of the cover 1, and in a closed state the predetermined end faces 2a and 3a contact each other.

Meanwhile, the end faces 2a and 3a of the first and second blades 2 and 3 may generally easily reflect light. Particularly, when the first and second blades 2 and 3 are made of metal pressed parts, the reflection may easily occur. For example, as shown in FIG. 12, when the blades 2 and 3 are in an open state, light C incident through the barrier unit reflects off the end faces 2a and 3a and the reflected light incident through a barrel, so that optical problems such as flare and ghosting may occur.

Figure 13:
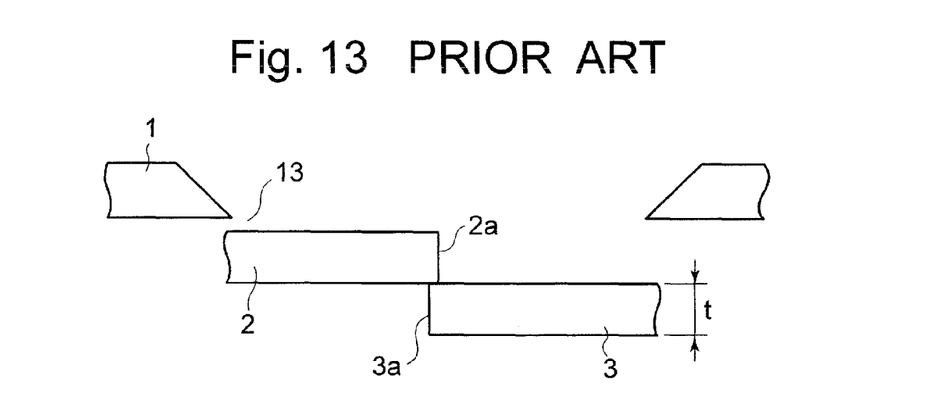
FIG. 13 is a cross-sectional view of the conventional barrier unit with the blades being in a closed state.

Reflection of the light C at the end faces 2a and 3a can be prevented by setting to a sufficiently the amount of retreat d of the blades 2 and 3 from the perimeter of the opening portion 1a of the cover 1 with the blades 2 and 3 being in an open state, large value. However, setting the amount of retreat d to a large value inhibits miniaturization of the barrier unit. In addition, by making the thickness t of the blades 2 and 3 sufficiently thin, reflection of light at the end faces 2a and 3a can be reduced. However, when the thickness t of the blades 2 and 3 is made thin, the amount of engagement between the end faces 2a and 3a in a thickness direction with the blades 2 and 3 being in a closed state is reduced. Hence, when, as shown in FIG. 13, the positions of the blades 2 and 3 are slightly displaced in the thickness direction, the end faces 2a and 3a do not contact each other and accordingly the blades 2 and 3 are likely to ride on top of each other. That is, there is a problem that a failure of opening and closing of the blades 2 and 3 is likely to occur.

To solve the above-described problems, a barrier unit is provided that can prevent a pair of blades from riding on top of each other when the blades are in a closed state. Another object is to provide a barrier unit that can suppress light from reflecting off end faces of blades when the blades are in an open state.

SUMMARY

In a first aspect, a barrier unit is provided. The barrier unit comprises a base; and a pair of blades mounted on the base, the pair of blades being configured to be positioned in an open state and a closed state and to contact each other at predetermined end faces of the blades in the closed state. An inclined portion is provided at a central portion in a longitudinal direction of each predetermined end face of the blades, the inclined portion defining a plane inclined with respect to an optical axis of a lens. A parallel portion is provided on both sides of the inclined portion of each predetermined end face of the blades, the parallel portion defining a plane parallel to the optical axis.

In a second aspect, a barrier unit is provided. The barrier unit comprises a base; and a pair of blades mounted on the base, the pair of blades being configured to be positioned in an open state and a closed state and to contact each other at predetermined end faces of the blades in the closed state, each predetermined end face of the blades having a plane parallel to an optical axis of a lens. Each predetermined end face of the blades is provided with a first portion and a second portion, the second portion having a greater thickness than the first portion.

According to the barrier unit of the first aspect, since an inclined portion is provided at a central portion in a longitudinal direction of each predetermined end face of the blades, the inclined portion defining a plane inclined with respect to an optical axis of a lens, reflection of light at the predetermined end faces of the blades is suppressed. Accordingly, the occurrence of flare and ghosting caused by reflection of light can be suppressed. Furthermore, since a parallel portion is provided on both sides of the inclined portion of each predetermined end face of the blades, the parallel portion defining a plane parallel to the optical axis, when the blades are in a closed state the predetermined end faces contact each other. Thus, the occurrence of operation failures due to the blades riding on top of each other when the blades are in a closed state can be suppressed.

According to the barrier unit of the second aspect, since each of predetermined end faces of a pair of blades is provided with a portion thicker than other portions, even when the positions of the blades are slightly displaced with respect to each other in a thickness direction when the blades are in a closed state, the predetermined end faces more easily contact each other. Thus, the occurrence of operation failures due to the blades riding on top of each other when the blades are in a closed state can be further favorably suppressed.

DETAIL DESCRIPTION OF PREFERRED EMBODIMENT

First Embodiment

Figure 1:
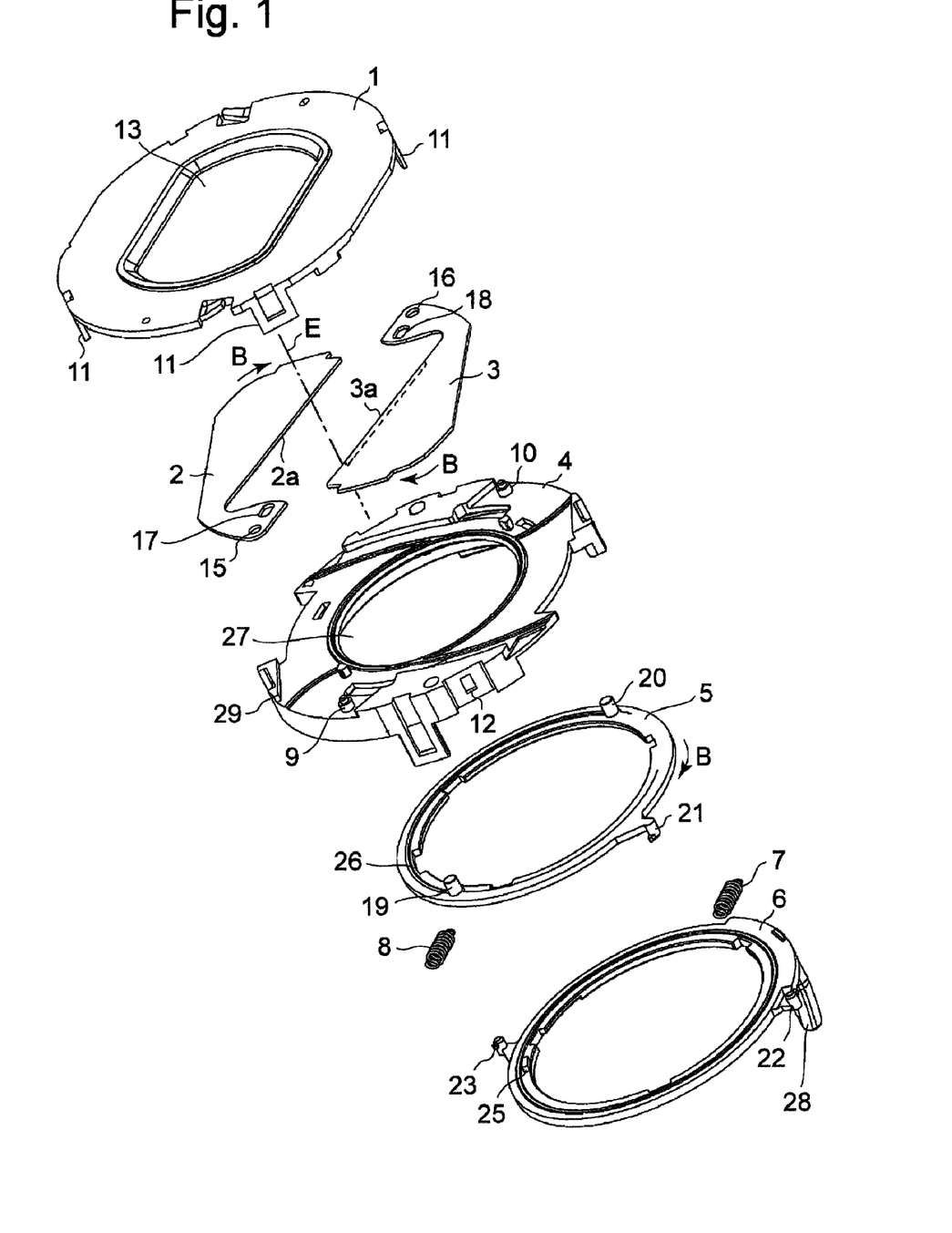
FIG. 1 is a perspective view seen from a top and showing a configuration of parts of a barrier unit according to a first embodiment.
Figure 2:
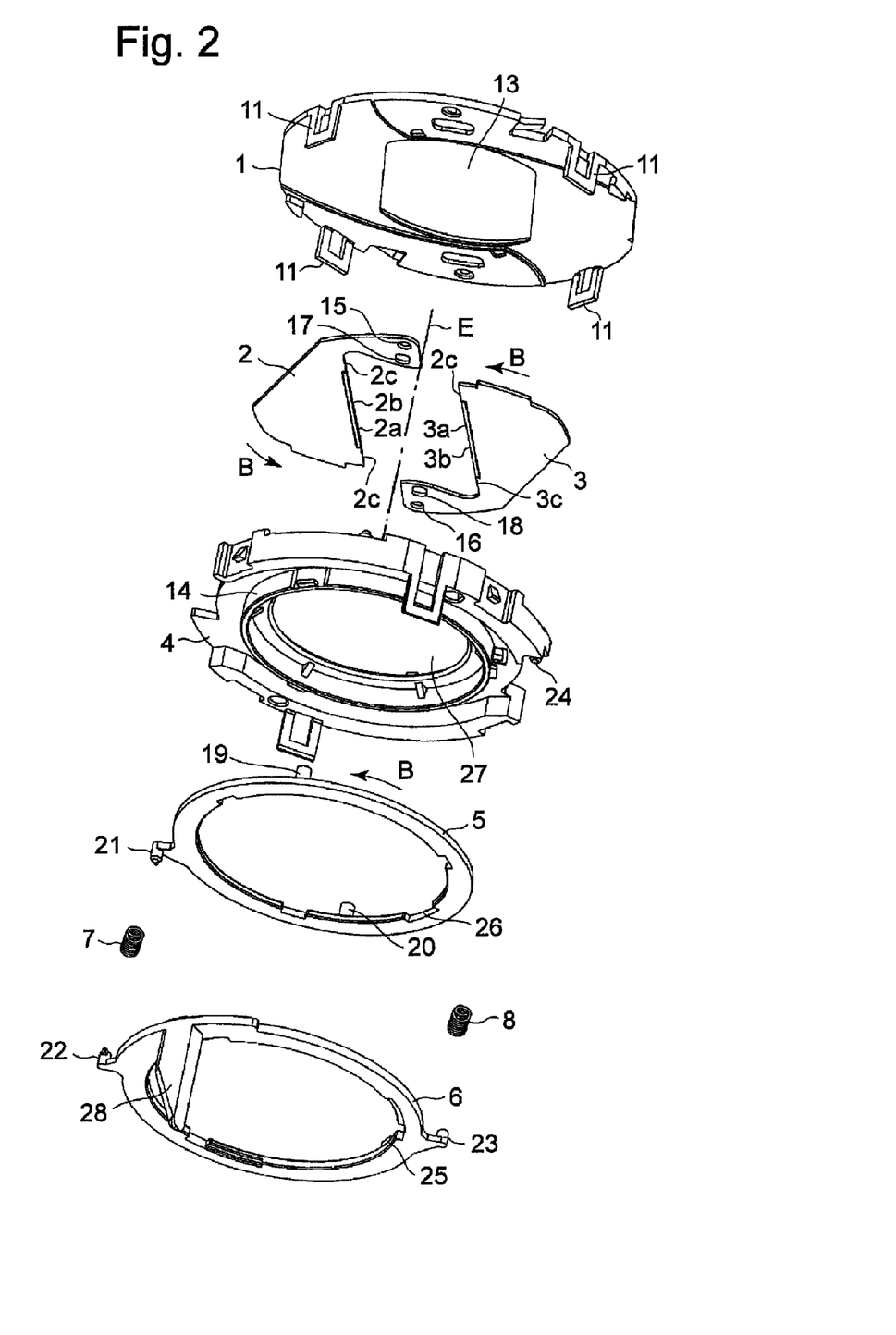
FIG. 2 is a perspective view seen from a bottom and showing the configuration of the parts of the barrier unit according to the first embodiment.
Figure 3:
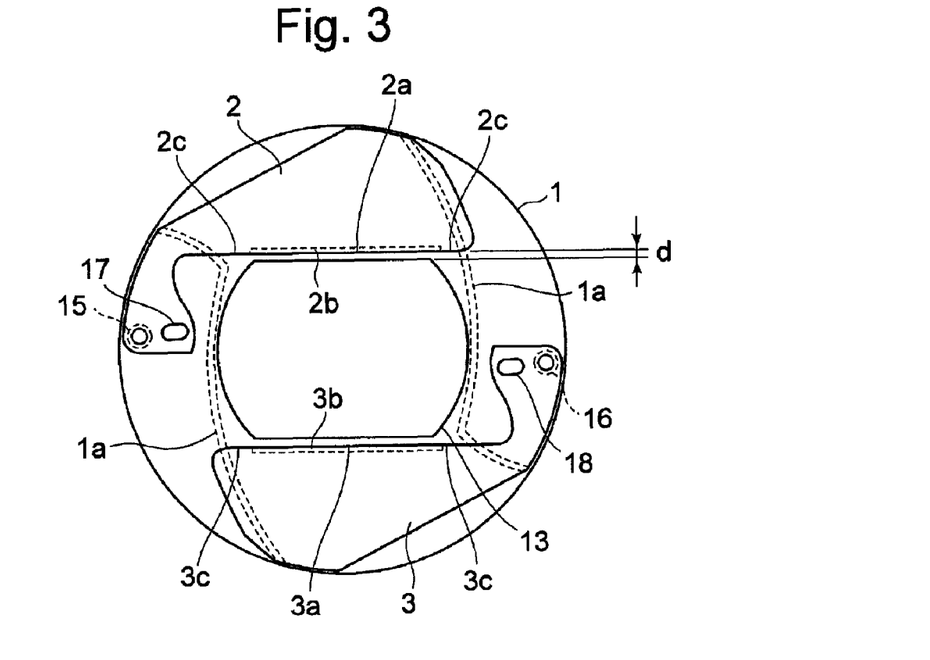
FIG. 3 is a plan view of the barrier unit according to the first embodiment being in an open state.
Figure 4:
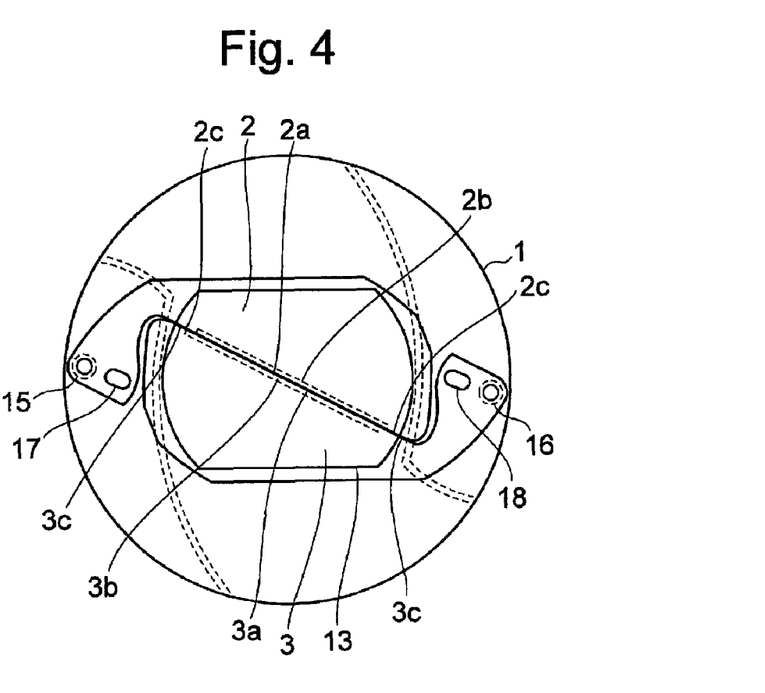
FIG. 4 is a plan view of the barrier unit according to the first embodiment being in a closed state.
Figure 5:
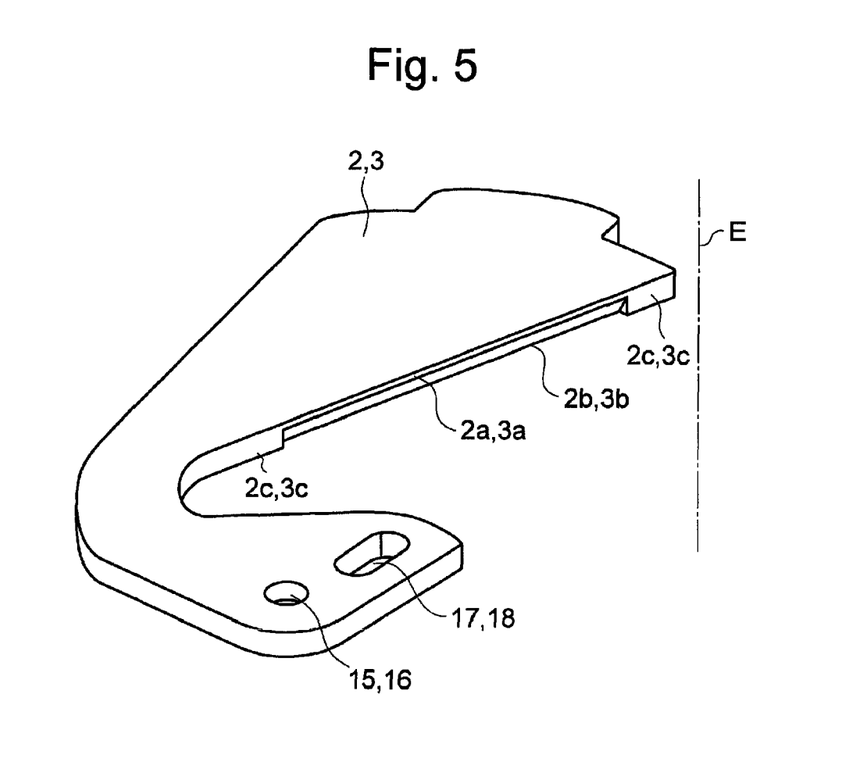
FIG. 5 is a detailed perspective view of first and second blades of the barrier unit according to the first embodiment.
Figure 6:
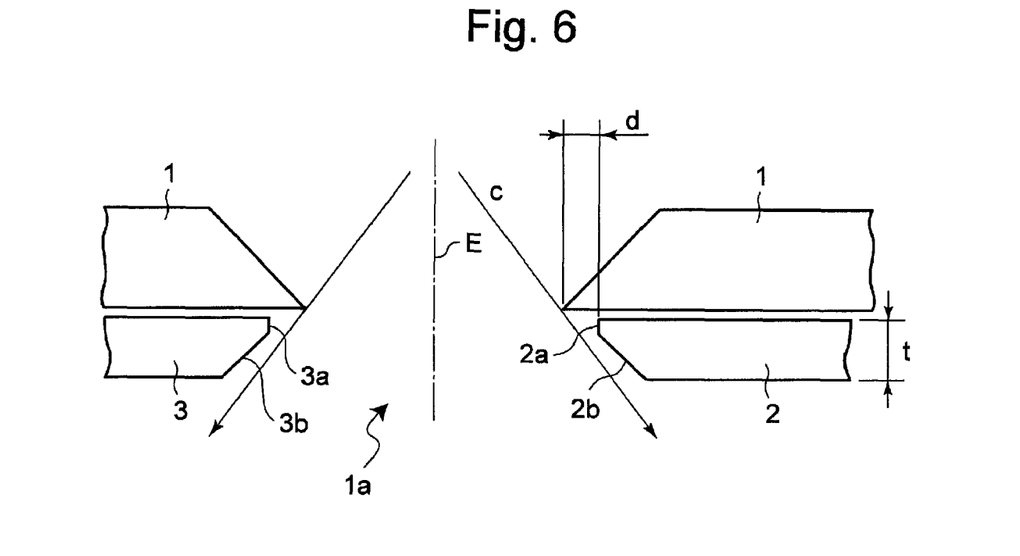
FIG. 6 is a cross-sectional view of the barrier unit according to the first embodiment, with the blades being in an open state (central portions of the respective blades).
Figure 7:
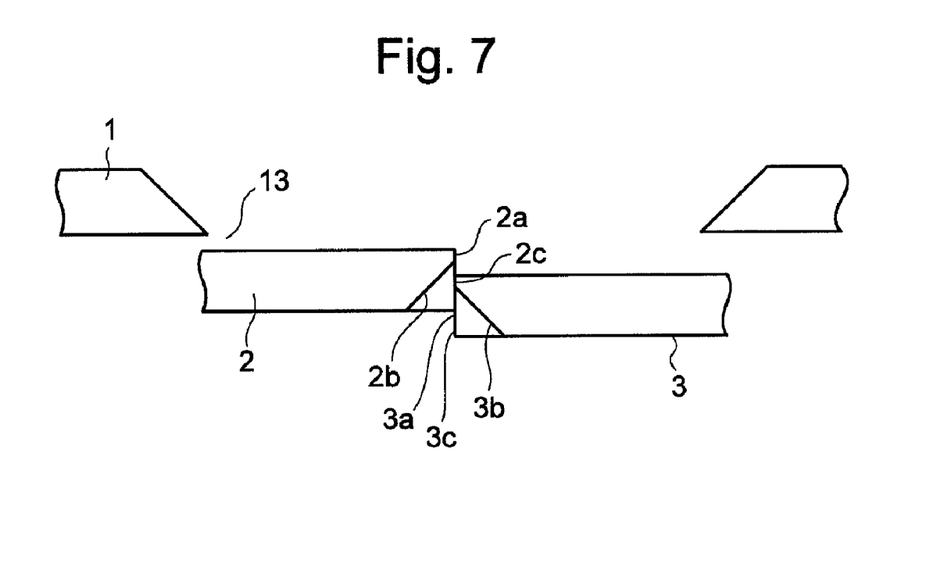
FIG. 7 is a cross-sectional view of the barrier unit according to the first embodiment, with the blades being in a closed state (the central portions of the respective blades).

FIG. 1 is a perspective view seen from a top and showing a configuration of parts of a barrier unit according to a first embodiment. FIG. 2 is a perspective view seen from a bottom and showing the configuration of the parts of the barrier unit according to the first embodiment. FIG. 3 is a plan view of the barrier unit according to the first embodiment being in an open state. FIG. 4 is a plan view of the barrier unit according to the first embodiment being in a closed state. FIG. 5 is a detailed perspective view of first and second blades 2 and 3 of the barrier unit according to the first embodiment. FIG. 6 is a cross-sectional view of the barrier unit according to the first embodiment, with the blades being in an open state (central portions of the respective blades). FIG. 7 is a cross-sectional view of the barrier unit according to the first embodiment, with the blades being in a closed state (the central portions of the respective blades).

A barrier unit has a cover 1, a first blade 2, a second blade 3, a base 4, a first ring 5, a second ring 6, a first spring 7, and a second spring 8.

The first and second blades 2 and 3 are rotatably mounted on the base 4 by inserting shafts 9 and 10 on the base 4 into rotating holes 15 and 16. The first and second blades 2 and 3 are made of metal pressed parts but can also be made by other methods.

The cover 1 is mounted on the base 4 by hooks 11 which are elastic and are provided integrally with the cover 1, with the hooks 11 engaging with hook stoppers 12 provided to the base 4. In this state, the first and second blades 2 and 3 are rotatably sandwiched between the cover 1 and the base 4 with a predetermined gap therebetween. The cover 1 is provided with an opening portion 13.

The first and second rings 5 and 6 are rotatably mounted on a cylinder portion 14 of the base 4. Cam pins 19 and 20 provided to the first ring 5 are respectively engaged with long holes 17 and 18 provided in the first and second blades 2 and 3 and thereby drive the blades 2 and 3 to rotate.

The first spring 7 is provided between a spring hook portion 21 of the first ring 5 and a spring hook portion 22 of the second ring 6 in a tensioned state.

The second spring 8 is provided between a spring hook portion 23 of the second ring 6 and a spring hook portion 24 of the base 4 in a tensioned state.

The second ring 6 is provided with a ring projection portion 25. The ring projection portion 25 is inserted into a notch portion 26 of the first ring 5.

The base 4 has an opening portion 27 provided therein.

The second ring 6 is provided with a cam portion 28. The cam portion 28 is urged by a drive means which is not shown. Thus, the second ring 6 is urged so as to rotate in a B direction. In addition, the first and second blades 2 and 3 are urged so as to rotate in a closing direction (B direction).

The first and second rings 5 and 6 are integrated by the first spring 7. When, after the second ring 6 is driven in the closing direction (B direction) through the cam portion 28 to close the first and second blades 2 and 3, and the second ring 6 is further driven to rotate in the closing direction, the first spring 7 stretches. Thus, overshooting of the second ring 6 relative to the first ring 5 is avoided. The second ring 6 is urged in an opening direction by the second spring 8 and the first ring 5 is driven through the ring projection portion 25 and the notch portion 26. The cam pin 19 urges the first blade 2 in the opening direction through the long hole 17. Thus, the first blade 2 is pressed against a stopper 29 and contacts the stopper 29 and then stops.

As shown in FIG. 5, the first and second blades 2 and 3 respectively have end faces 2a and 3a that contact each other when the blades 2 and 3 are in a closed state (hereinafter, appropriately referred to as "contacting end faces 2a and 3a"). At substantially central portions in a longitudinal direction of the respective contacting end faces 2a and 3a, inclined portions 2b and 3b which are inclined with respect to an optical axis E of lenses are provided. The inclined portions 2b and 3b of the pair of blades 2 and 3 are inclined in opposite directions from each other, with the optical axis E therebetween. On the both-end sides of the inclined portions 2b and 3b, parallel portions 2c and 3c which are end faces parallel to the optical axis E of the lenses are provided.

In a barrier unit as disclosed in FIGS. 1 to 5, the contacting end faces 2a and 3a of the first and second blades 2 and 3 easily reflect light. Particularly, the reflection is likely to occur when the first and second blades 2 and 3 are sheet metal parts. However, in the barrier unit according to the first embodiment, as shown in FIG. 6, the inclined portions 2b and 3b are provided at the central portions in the longitudinal direction of the respective contacting end faces 2a and 3a. The inclined portions 2b and 3b can prevent the light C incident to the barrier unit from traveling to end faces 2a and 3a of the first and second blades 2 and 3, enabling to prevent the incident light C from reflecting off the contacting end faces 2a and 3a. Therefore, optical problems such as flare and ghosting do not occur.

In addition, since the inclined portions 2b and 3b are provided, as shown in FIGS. 3 and 6, without setting, to a large value the amount of retreat d of the blades 2 and 3 from the perimeter of the opening portion 13 of the cover 1 with the first and second blades 2 and 3 being in an open state, the incident light C does not reflect off the contacting end faces 2a and 3a of the first and second blades 2 and 3. Accordingly, the amount of retreat d of the blades 2 and 3 can be set to a small value, whereby miniaturization of the barrier unit can be achieved.

In addition, the parallel portions 2c and 3c are provided on the both sides, in the longitudinal direction, of the inclined portions 2b and 3b of the contacting end faces 2a and 3a. Hence, as shown in FIG. 7, when the blades 2 and 3 are in a closed state, the parallel portions 2c and 3c contact each other. Here, the parallel portions 2c and 3c are formed such that the thickness thereof is thicker than that of the inclined portions 2b and 3b. Hence, even when thin inclined portions 2b and 3b are provided at the central portions of the respective blades 2 and 3, in a closed state of the blades 2 and 3, the parallel portions 2c and 3c can securely contact each other. Thus, the blades 2 and 3 are prevented from riding on top of each other, enabling to suppress operation failures.

Second Embodiment

Figure 8:
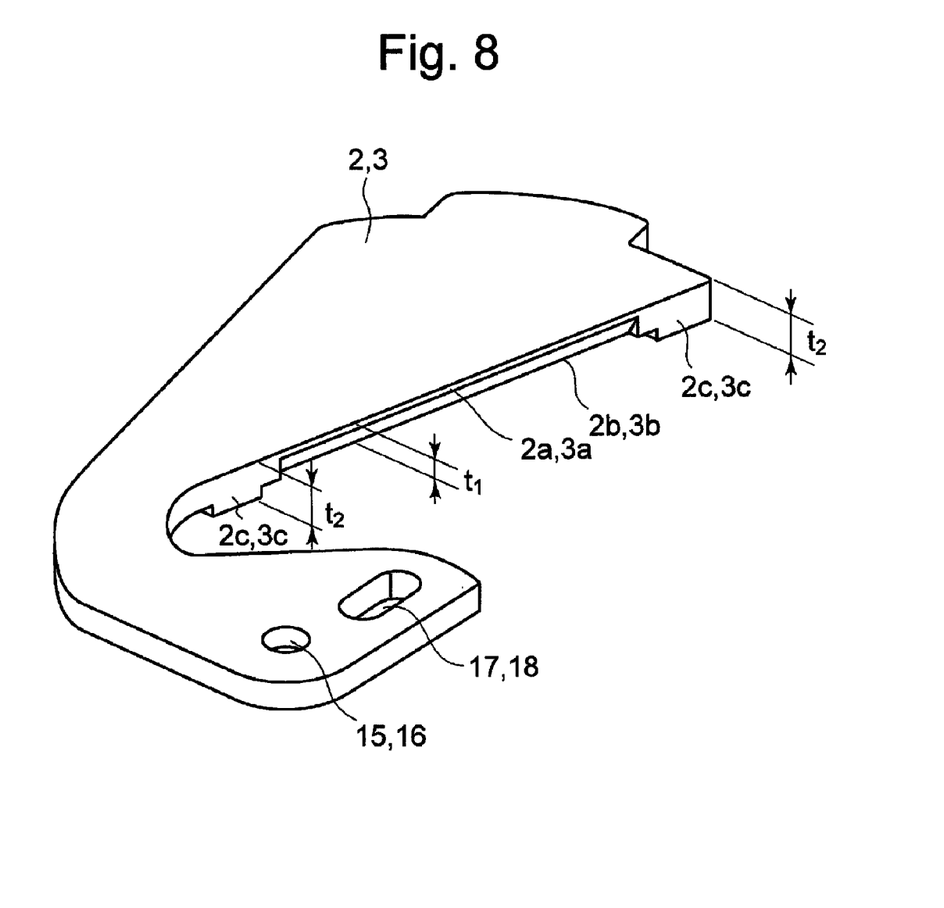
FIG. 8 is a detailed perspective view of first and second blades of a barrier unit according to a second embodiment.
Figure 9:
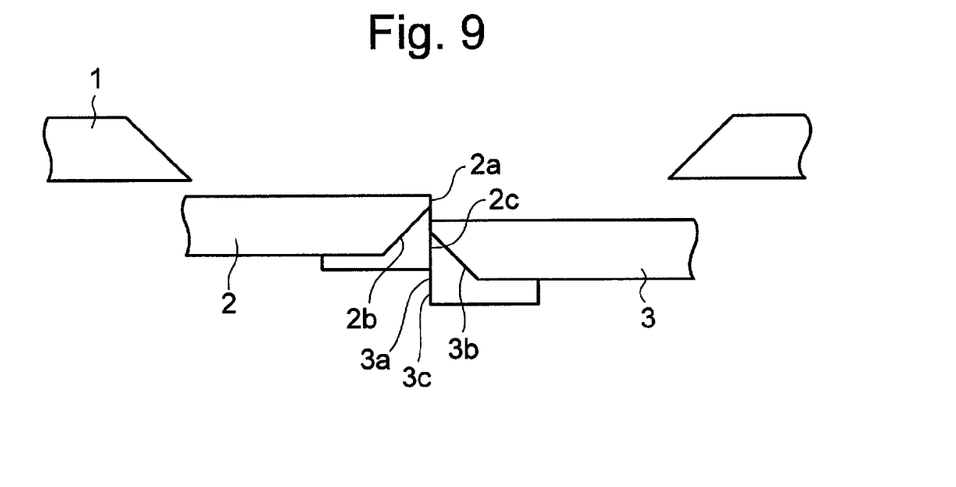
FIG. 9 is a cross-sectional view of the barrier unit according to the second embodiment, with the blades being in a closed state (central portions of the respective blades).

FIG. 8 is a detailed perspective view of first and second blades 2 and 3 of a barrier unit according to a second embodiment. FIG. 9 is a cross-sectional view of the barrier unit according to the second embodiment, with the blades 2 and 3 being in a closed state (central portions of the respective blades). In the barrier unit according to the second embodiment, as shown in FIG. 8, the thickness t2 of central portions of respective parallel portions 2c and 3c provided on the both sides of inclined portions 2b and 3b is made thicker than the thickness t1 of other portions (the inclined portions 2b and 3b, and portions near the ends, in a longitudinal direction of the inclined portions 2b and 3b). Thus, when the blades 2 and 3 are in a closed state, as shown in FIG. 9, an engageable amount in a thickness direction with the blades 2 and 3 being in a closed state is increased. Hence, even when the positions of the blades 2 and 3 are slightly displaced with respect to each other in the thickness direction with the blades 2 and 3 being in a closed state, end faces 2a and 3a easily contact each other. Thus, the occurrence of operation failures due to the blades 2 and 3 riding on top of each other when the blades 2 and 3 are in a closed state is further favorably suppressed.

Third Embodiment

Figure 10:
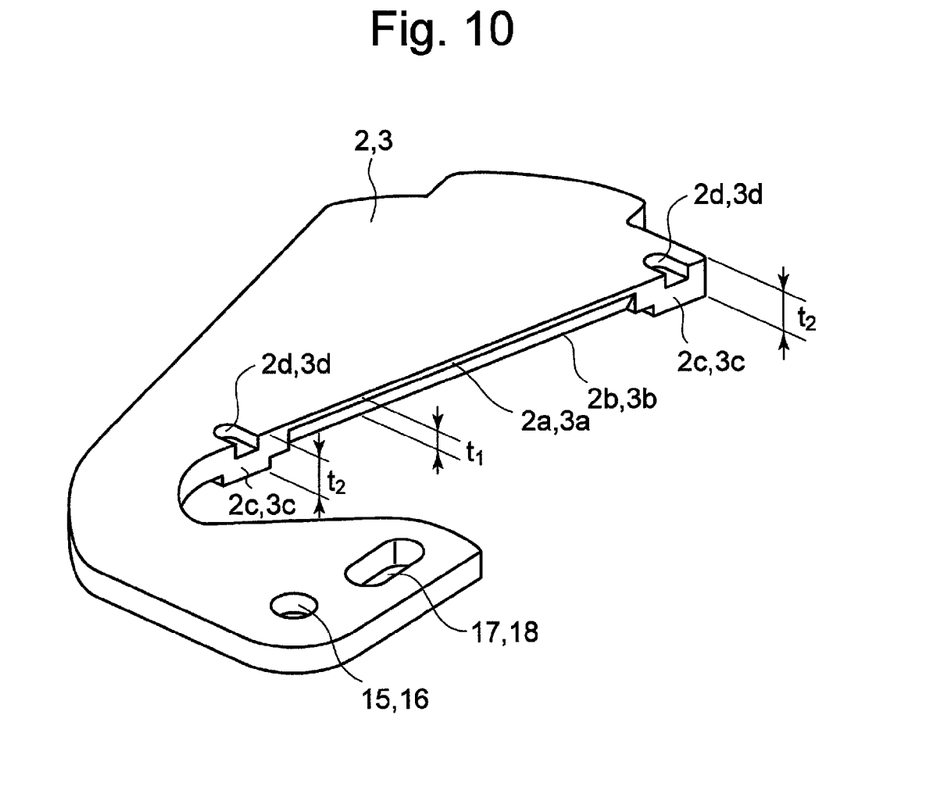
FIG. 10 is a detailed perspective view of first and second blades of a barrier unit according to a third embodiment.

FIG. 10 is a detailed perspective view of first and second blades 2 and 3 of a barrier unit according to a third embodiment. As with the second embodiment, the first and second blades 2 and 3 of the barrier unit according to the third embodiment are also configured such that the thickness t2 of a part of parallel portions 2c and 3c is made thicker than the thickness t1 of other portions. Specifically, by forming protruding portions by pressing out central portions 2d and 3d of the parallel portions 2c and 3c by press molding, portions having the different thicknesses are formed. According to the third embodiment, the first and second blades 2 and 3 having the parallel portions 2c and 3c can be formed using sheet metal by an easy method such as press molding.

Fourth Embodiment

Figure 11:
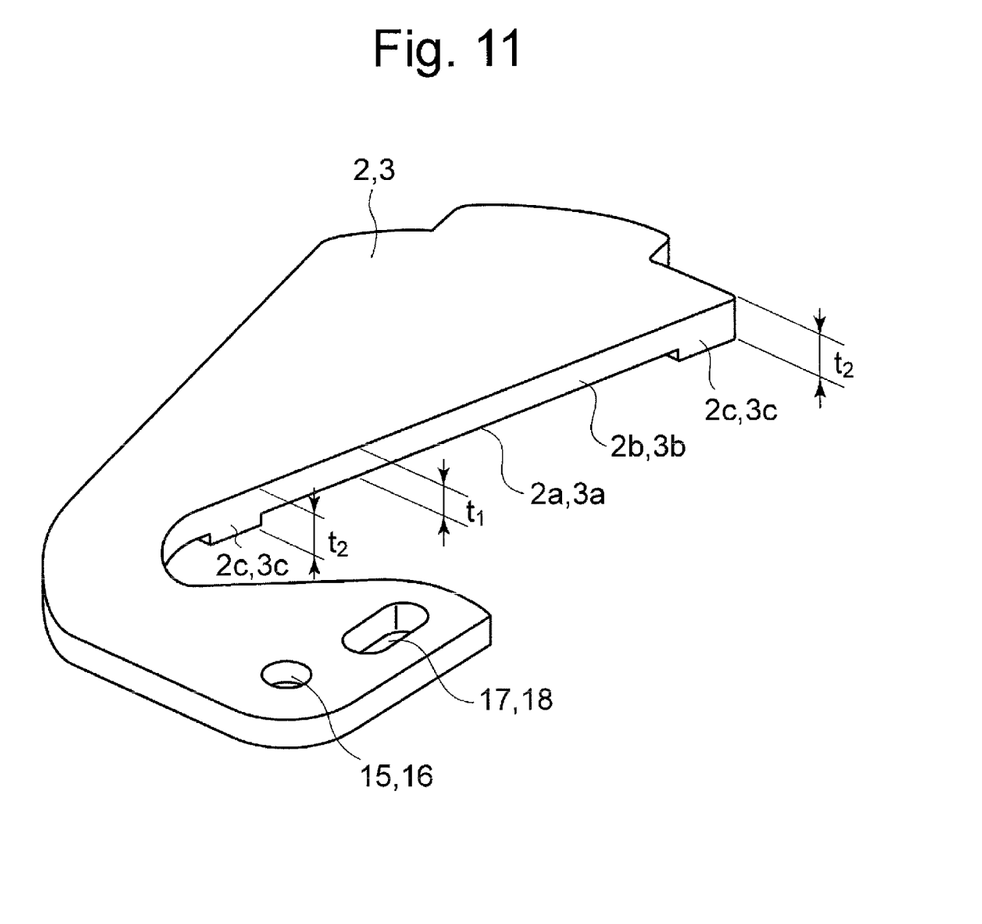
FIG. 11 is a detailed perspective view of first and second blades of a barrier unit according to a fourth embodiment.

FIG. 11 is a detailed perspective view of first and second blades 2 and 3 of a barrier unit according to a fourth embodiment. As shown in FIG. 11, end faces 2a and 3a of first and second blades 2 and 3 contact each other when the blades 2 and 3 are in a closed state. The thickness t2 of both-end portions 2c and 3c of the contacting end faces 2a and 3a is thicker than the thickness t1 of central portions 2b and 3b. Thus, an engageable amount in a thickness direction with the blades 2 and 3 being in a closed state can be increased. Hence, even when the positions of the blades 2 and 3 are slightly displaced in the thickness direction in a closed state of the blades 2 and 3, the end faces 2a and 3a easily contact each other. Thus, occurrence of operation failures due to the blades 2 and 3 riding on top of each other when the blades 2 and 3 are in a closed state is favorably suppressed.

INDUSTRIAL APPLICABILITY

The embodiments can be widely applied to barrier units used to protect lenses, and so on, of still cameras and video movie cameras.

What is claimed is:
1. A barrier unit comprising:
a base;
a pair of blades mounted on the base, the pair of blades being configured to be positioned in an open state and a closed state and to contact each other at predetermined end faces of the blades in the closed state; and
a cover mounted on the base and having an opening through which an incident light passes, the blades being rotatably sandwiched between the cover and the base, wherein:
an inclined portion is provided at a central portion in a longitudinal direction of each predetermined end face of the blades, the inclined portion being a flat plane inclined with respect to an optical axis of a lens;
a parallel portion is provided on each predetermined end face of the blades on both sides of the inclined portion, the parallel portion defining a plane parallel to the optical axis;
the opening of the cover includes a pair of straight portions parallel with each other; and
a length of the inclined portion of each blade is longer than a length of each of the straight portions of the opening of the cover.

2. The barrier unit according to claim 1, wherein the inclined portions of the pair of blades are inclined in opposite directions from each other with respect to the optical axis.

3. The barrier unit according to claim 1, wherein a thickness of the parallel portion of each predetermined end face of the blades is thicker than a thickness of the inclined portion of each predetermined end face of the blades.

4. The barrier unit according to claim 1, wherein the blades are made by sheet metal processing.

5. The barrier unit according to claim 1, wherein when the pair of blades are positioned in the opened state, the pair of straight portions of the opening are parallel to the parallel portions provided on the pair of blades, respectively.

6. The barrier unit according to claim 1, wherein each of the blades has an axis of rotation parallel to the optical axis.

7. A barrier unit comprising:
a base;
a pair of blades mounted on the base, the pair of blades being configured to be positioned in an open state and a closed state and to contact each other at predetermined end faces of the blades in the closed state, each predetermined end face of the blades having a plane parallel to an optical axis of a lens; and
a cover mounted on the base and having an opening through which an incident light passes, the blades being rotatably sandwiched between the cover and the base, wherein:
each predetermined end face of the blades is provided with a first portion with a first uniform thickness and a second portion with a second uniform thickness, the second uniform thickness of the second portion being greater than the first uniform thickness of the first portion;
the opening of the cover includes a pair of straight portions parallel with each other; and
a length of the first portion of each blade is longer than a length of each of the straight portions of the opening of the cover.

8. The barrier unit according to claim 7, wherein the blades are made by sheet metal processing.

9. The barrier unit according to claim 7, wherein the second portion with the second uniform thickness is disposed at an end portion of each predetermined end face of the blades and the first portion with the first uniform thickness is disposed at a central portion of each predetermined end face of the blades.

10. The barrier unit according to claim 7, wherein when the pair of blades are positioned in the opened state, the pair of straight portions of the opening are parallel to the second portions provided on the pair of blades, respectively.

* * * * *